US012794018B2

(12) United States Patent
Ishikawa et al.

(10) Patent No.: US 12,794,018 B2
(45) Date of Patent: Nov. 10, 2026

(54) ELECTROLYTIC SOLUTION, LITHIUM SULFUR SECONDARY BATTERY AND MODULE

(71) Applicants: THE SCHOOL CORPORATION KANSAI UNIVERSITY, Suita (JP); DAIKIN INDUSTRIES, LTD., Osaka (JP)

(72) Inventors: Masashi Ishikawa, Suita (JP); Kaihei Kishida, Suita (JP); Tomoya Hidaka, Osaka (JP); Shigeaki Yamazaki, Osaka (JP); Yoshiko Kuwajima, Osaka (JP)

(73) Assignees: THE SCHOOL CORPORATION KANSAI UNIVERSITY, Suita (JP); INDUSTRIES, LTD., Osaka (JP)

( * ) Notice: Subject to any disclaimer, the term of this patent is extended or adjusted under 35 U.S.C. 154(b) by 931 days.

(21) Appl. No.: 17/774,277

(22) PCT Filed: Oct. 19, 2020

(86) PCT No.: PCT/JP2020/039264
§ 371 (c)(1),
(2) Date: May 4, 2022

(87) PCT Pub. No.: WO2021/090666
PCT Pub. Date: May 14, 2021

(65) Prior Publication Data

US 2022/0416302 A1 Dec. 29, 2022

(30) Foreign Application Priority Data

Nov. 5, 2019 (JP) ................................ 2019-200473

(51) Int. Cl.

| | |
|---|---|
| ***H01M 10/00*** | (2006.01) |
| ***H01M 4/58*** | (2010.01) |
| ***H01M 10/052*** | (2010.01) |
| ***H01M 10/0568*** | (2010.01) |
| ***H01M 10/0569*** | (2010.01) |
| *H01M 4/02* | (2006.01) |

(52) U.S. Cl.
CPC ..... *H01M 10/0569* (2013.01); *H01M 4/5815* (2013.01); *H01M 10/052* (2013.01); *H01M 10/0568* (2013.01); *H01M 2004/027* (2013.01); *H01M 2004/028* (2013.01); *H01M 2300/0034* (2013.01)

(58) Field of Classification Search
CPC ........... H01M 10/0569; H01M 4/5815; H01M 10/052; H01M 10/0568; H01M 2004/027; H01M 2004/028; H01M 2300/0034; H01M 4/38; H01M 4/58; H01M 4/60; H01M 10/0567
See application file for complete search history.

(56) References Cited

U.S. PATENT DOCUMENTS

| | | | | |
|---|---|---|---|---|
| 9,472,813 | B2 | 10/2016 | Uzun et al. | |
| 2009/0325065 | A1 | 12/2009 | Fujii et al. | |
| 2013/0260229 | A1 | 10/2013 | Uzun et al. | |
| 2014/0023916 | A1* | 1/2014 | Koh | H01G 11/64 429/188 |
| 2014/0052322 | A1 | 2/2014 | Takeshi | |
| 2014/0342209 | A1* | 11/2014 | He | H01M 10/056 429/101 |
| 2018/0331393 | A1* | 11/2018 | Cho | H01M 10/0568 |

FOREIGN PATENT DOCUMENTS

| | | | | |
|---|---|---|---|---|
| CN | 103259044 | A | 8/2013 | |
| CN | 105977534 | A | 9/2016 | |
| EP | 2980063 | A1 * | 2/2016 | H01G 11/62 |
| JP | 2005-108724 | A | 4/2005 | |
| JP | 2012-238448 | A | 12/2012 | |
| JP | 2014-503964 | A | 2/2014 | |

OTHER PUBLICATIONS

Machine translation of CN 105977534, obtained Aug. 2025 (Year: 2016).*
International Preliminary Report on Patentability with translation of Written Opinion issued May 10, 2022 in International Application No. PCT/JP2020/039264.
International Search Report for PCT/JP2020/039264 dated, Dec. 22, 2020 (PCT/ISA/210).
Extended European Search Report dated Sep. 27, 2024 in Application No. 20884418.3.

* cited by examiner

*Primary Examiner* — Nicholas P D'Aniello
(74) *Attorney, Agent, or Firm* — Sughrue Mion, PLLC

(57) ABSTRACT

Provided is a lithium sulfur secondary battery excellent in durability. An electrolytic solution to be used for a lithium sulfur secondary battery having a positive electrode containing a sulfur-containing electrode active material containing at least one selected from the group consisting of simple sulfur, lithium polysulfides ($Li_2S_n$: $1<n<8$) and organosulfur compounds, and a negative electrode containing a material that occludes and releases lithium ions, the electrolytic solution containing a nonaqueous electrolyte and a solvent, wherein the solvent contains vinylene carbonate in a proportion of 10 to 100% by weight.

7 Claims, No Drawings

ELECTROLYTIC SOLUTION, LITHIUM SULFUR SECONDARY BATTERY AND MODULE

CROSS REFERENCE TO RELATED APPLICATIONS

This application is a National Stage of International Application No. PCT/JP2020/039264 filed Oct. 19, 2020, claiming priority based on Japanese Patent Application No. 2019-200473 filed Nov. 5, 2019.

TECHNICAL FIELD

The present disclosure relates to an electrolytic solution, a lithium sulfur secondary battery, and a module.

BACKGROUND ART

As high-capacity secondary batteries, lithium ion secondary batteries are widely used, and as higher-capacity secondary batteries, lithium sulfur secondary batteries are being studied. In these various types of batteries, the properties of electrolytic solution largely affect the performance of the batteries.

Patent Literature 1 discloses, as a comparative example, a lithium sulfur battery using a nonaqueous electrolyte containing vinylene carbonate.

Patent Literature 2 discloses vinylene carbonate as an example of a compound which can be contained in an electrolytic solution.

CITATION LIST

Patent Literature

Patent Literature 1: Japanese Patent Laid-Open No. 2005-108724

Patent Literature 2: Japanese Patent Laid-Open No. 2012-238448

SUMMARY OF INVENTION

Technical Problem

The present disclosure has an object to provide an electrolytic solution capable of providing a lithium sulfur secondary battery excellent in durability.

Solution to Problem

The present disclosure is an electrolytic solution to be used for a lithium sulfur secondary battery having a positive electrode containing a sulfur-containing electrode active material containing at least one selected from the group consisting of simple sulfur, lithium polysulfides ($Li_2S_n$: 1<n<8) and organosulfur compounds, and a negative electrode containing a material that occludes and releases lithium ions, the electrolytic solution comprising a nonaqueous electrolyte and a solvent, wherein the solvent comprises vinylene carbonate in a proportion of 10 to 100% by weight.

It is preferable that the solvent further comprises a fluorinated carbonate represented by the following general formula (1) and/or an ether represented by the general formula (2):

[Formula 1]

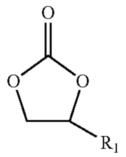

(1)

wherein $R_1$ is a fluorine group or an alkyl group having 1 to 4 carbon atoms containing a fluorine group and optionally having an ether bond and/or an unsaturated bond;

$$R_2\text{—}(OCHR_{3A}CH_2)_x\text{—}OR_{3B} \quad (2)$$

wherein $R_2$ and $R_{3B}$ are each independently selected from the group consisting of an alkyl group having 1 to 9 carbon atoms and optionally substituted with fluorine, a phenyl group optionally substituted with a halogen atom and a cyclohexyl group optionally substituted with a halogen atom, and optionally together form a ring; $R_{3A}$ each independently represent H or $CH_3$; and x represents 0 to 10.

It is preferable that the fluorinated carbonate represented by the general formula (1) is fluoroethylene carbonate.

It is preferable that the nonaqueous electrolyte comprises at least one compound selected from the group consisting of $LiPF_6$, lithium bis(trifluoromethanesulfonyl)imide (LiTFSI) and lithium bis(fluorosulfonyl)imide (LiFSI).

The present disclosure is a lithium sulfur secondary battery comprising a positive electrode containing a sulfur-containing electrode active material containing at least one selected from the group consisting of simple sulfur, lithium polysulfides (Li2Sn: 1<n<8) and organosulfur compounds, and a negative electrode containing a material that occludes and releases lithium ions, wherein the lithium sulfur secondary battery comprises the above-mentioned electrolytic solution.

The present disclosure is also a module comprising the above-mentioned lithium sulfur secondary battery.

Advantageous Effect of Invention

The lithium sulfur secondary battery comprising the electrolytic solution of the present disclosure exhibits durability, more specifically, performance excellent in the capacity retention in long-term use.

DESCRIPTION OF EMBODIMENTS

Hereinafter, the present disclosure will be described in detail.

The present disclosure is an electrolytic solution to be used for a lithium sulfur secondary battery having a positive electrode containing a sulfur-containing electrode active material containing at least one selected from the group consisting of simple sulfur, lithium polysulfides ($Li_2S_n$: 1<n<8) and organosulfur compounds, and a negative electrode containing a material that occludes and releases lithium ions. That is, the present disclosure provides the electrolytic solution capable of improving the performance of lithium sulfur secondary batteries on which research and development has been progressed in recent years.

Specifically, a solvent in the electrolytic solution comprises vinylene carbonate in a proportion of 10 to 100% by weight.

Then, the vinylene carbonate is a compound represented by the following general formula (3):

[Formula 2]

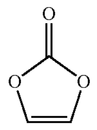

(3)

In lithium sulfur secondary batteries, it is said that the discharge capacity is lowered by repetition of charge and discharge due to dissolving-out, into an electrolytic solution, of lithium polysulfide ($Li_2Sn$) generated by the electrode reaction in charge and discharge, making the battery life short. The present disclosure has been completed by a finding that the use of the electrolytic solution comprising vinylene carbonate in a specific proportion can solve such a problem.

In the present disclosure, it is also an important characteristic that vinylene carbonate is contained in a proportion of 10 to 100% by weight with respect to the total amount of the solvent in the electrolytic solution. That is, when the content is as low as less than 10% by weight in the solvent, it is not preferable in that the effect of improving the durability cannot sufficiently be attained.

The action of causing the effect of the present disclosure is not clear, but it is presumed because vinylene carbonate forms a film on the positive electrode containing sulfur, and dissolving-out of lithium polysulfide is thereby suppressed.

Since vinylene carbonate is a compound reacting with a sulfur-containing electrode active material, there has conventionally been no attempt of using such a compound as an electrolytic solution of lithium sulfur batteries. Actually, Patent Literature 2 discloses, as a comparative example, an electrolytic solution containing a very small amount of vinylene carbonate, and discloses that battery performance is deteriorated.

However, it has been made clear that the battery performance is improved when a predetermined amount of vinylene carbonate is actually contained as the solvent of the electrolytic solution. That is, it is presumed that vinylene carbonate reacts with the sulfur-containing electrode active material or forms a film on the sulfur positive electrode in the first-cycle charge process, and dissolving-out of the lithium polysulfide is thereby rather suppressed, improving the performance as a battery. Such a result is a fact beyond expectations of those skilled in the art, and the fact is not an item which those skilled in the art can easily know, for example, from the description of Patent Literature 2.

"Solvent" herein means a compound having volatility among liquid components contained in the electrolytic solution. In electrolytic solutions of lithium sulfur batteries, a nonaqueous electrolyte is contained. Such an electrolyte is a component having no volatility. The "solvent" in the present disclosure is used concurrently with these nonaqueous electrolytes in the electrolytic solution, and means a volatile liquid compound such as various kinds of carbonate compounds, ether compounds and ester compounds. The solvent may be, for example, one to be used concurrently in two or more kinds among these.

In the lithium sulfur secondary battery of the present disclosure, vinylene carbonate is contained in a proportion of 10 to 100% by weight with respect to the total weight of the solvent. When the amount of vinylene carbonate is larger or smaller than the above range, the capacity retention in long-term use cannot be made good.

The lower limit of the amount of vinylene carbonate to be contained is more preferably 25% by weight. The upper limit of the amount of vinylene carbonate to be contained is more preferably 75% by weight. When the vinylene carbonate in such a range in contained, the object of the present disclosure can most suitably be achieved.

Then, the electrolytic solution is a nonaqueous electrolytic solution.

The electrolytic solution to be used in the lithium sulfur secondary battery of the present disclosure may contain a solvent other than vinylene carbonate (hereinafter, referred to as "additional solvent").

The additional solvent is not limited, and any solvents which can be used as solvents in electrolytic solutions in the battery field can be used.

Specifically, the solvents include fluorinated saturated cyclic carbonates, fluorinated chain carbonates, ether compounds, fluorinated ethers and fluorinated esters. Among these, it is preferable to concurrently use a fluorinated saturated cyclic carbonate, an ether compound or a fluorinated ether. These compounds are preferable in the point of improved battery output.

Among the above-mentioned solvents, it is especially preferable to contain a fluorinated carbonate represented by the following general formula (1) or an ether represented by the following general formula (2):

[Formula 3]

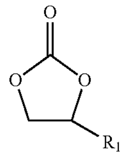

(1)

wherein $R_1$ is a fluorine group or an alkyl group having 1 to 4 carbon atoms containing a fluorine group and optionally having an ether bond and/or an unsaturated bond;

$$R_2—(OCHR_{3A}CH_2)_x—OR_{3b} \quad (2)$$

wherein $R_2$ and $R_{3B}$ are each independently selected from the group consisting of an alkyl group having 1 to 9 carbon atoms and optionally substituted with fluorine, a phenyl group optionally substituted with a halogen atom and a cyclohexyl group optionally substituted with a halogen atom, and optionally together form a ring; $R_{3A}$ each independently represent H or $CH_3$; and x represents 0 to 10.

Hereinafter, these other solvents will be described in detail.

(Fluorinated Saturated Cyclic Carbonate)

The fluorinated saturated cyclic carbonate is preferably represented by the formula (4):

[Formula 4]

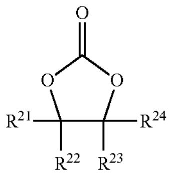

(4)

wherein $R^{21}$ to $R^{24}$ are identical or different, and each represent —H, —$CH_3$, —F, a fluorinated alkyl group optionally having an ether bond, or a fluorinated alkoxy group optionally having an ether bond; provided that at least one of $R^{21}$ to $R^{24}$ is —F, a fluorinated alkyl group optionally having an ether bond, or a fluorinated alkoxy group optionally having an ether bond.

The fluorinated alkyl group is preferably one having 1 to 10 carbon atoms, more preferably one having 1 to 6 carbon atoms and still more preferably one having 1 to 4 carbon atoms.

The fluorinated alkyl group may be linear or branched chain.

The fluorinated alkoxy group is preferably one having 1 to 10 carbon atoms, more preferably one having 1 to 6 carbon atoms and still more preferably one having 1 to 4 carbon atoms.

The fluorinated alkoxy group may be linear or branched chain.

$R^{21}$ to $R^{24}$ are identical or different, and it is preferable that $R^{21}$ to $R^{24}$ are each at least one selected from the group consisting of —H, —$CH_3$, —F, —$CF_3$, —$C_4F_9$, —$CHF_2$, —$CH_2F$, —$CH_2CF_2CF_3$, —$CH_2$—$CF(CF_3)_2$, —$CH_2$—O—$CH_2CHF_2CF_2H$, —$CH_2CF_3$ and —$CF_2CF_3$.

In this case, at least one of $R^{21}$ to $R^{24}$ is at least one selected from the group consisting of —F, —$CF_3$, —$C_4F_9$, —$CHF_2$, —$CH_2F$, —$CH_2CF_2CF_3$, —$CH_2$—$CF(CF_3)$ 2, —$CH_2$—O—$CH_2CHF_2F_2H$, —$CH_2CF_3$ and —$CF_2CF_3$.

It is preferable that the fluorinated saturated cyclic carbonate is at least one selected from the group consisting of the following compounds:

[Formula 5]

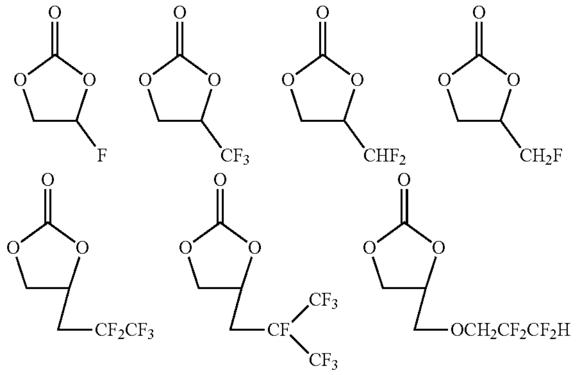

-continued

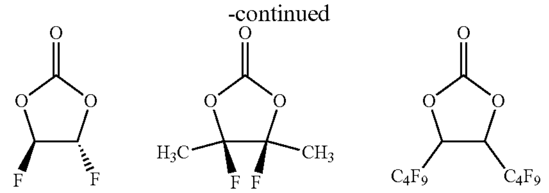

In the present disclosure, it is more preferable that the additional solvent is, among cyclic saturated carbonates, a compound represented by the general formula:

[Formula 6]

(1)

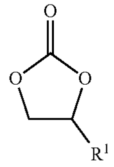

wherein $R_1$ is a fluorine group or an alkyl group having 1 to 4 carbon atoms containing a fluorine group and optionally having an ether bond and/or an unsaturated bond. The above compound is preferable in the point of improved battery output. Further it is most preferable to use fluoroethylene carbonate represented by the general formula:

[Formula 7]

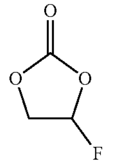

(Fluorinated Chain Carbonate)

The fluorinated chain carbonate is preferably represented by the following general formula:

[Formula 8]

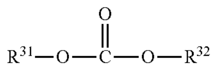

wherein $R^{31}$ and $R^{32}$ are identical or different, and represent an alkyl group optionally having an ether bond and optionally having a fluorine atom; provided that either one of $R^{31}$ and $R^{32}$ has a fluorine atom.

The alkyl group is preferably one having 1 to 10 carbon atoms, more preferably one having 1 to 6 carbon atoms and still more preferably one having 1 to 4 carbon atoms.

The alkyl group may be linear or branched chain.

$R^{31}$ and $R^{32}$ are identical or different, and it is preferable that $R^{31}$ and $R^{32}$ are each at least one selected from the group consisting of —$CH_3$, —$CF_3$, —$CHF_2$, —$CH_2F$, —$C_2H_5$, —$CH_2CF_3$, —$CH_2CHF_2$ and —$CH_2CF_2CF_2H$.

In this case, at least one of $R^{31}$ and $R^{32}$ is at least one selected from the group consisting of —$CF_3$, —$CHF_2$, —$CH_2F$, —$CH_2CHF_2$, —$CH_2CF_3$ and —$CH_2CF_2CF_2H$.

It is preferable that the fluorinated chain carbonate is at least one selected from the group consisting of the following compounds:

[Formula 9]

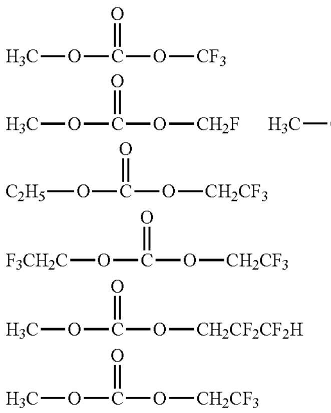

(Fluorinated Ester)

The fluorinated ester is preferably represented by the following general formula:

[Formula 10]

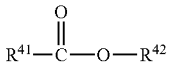

wherein $R^{41}$ and $R^{42}$ are identical or different, and each represent an alkyl group optionally having an ether bond and optionally having a fluorine atom, and optionally bond with each other to form a ring; provided that either one of $R^{41}$ and $R^{42}$ has a fluorine atom.

The alkyl group is preferably one having 1 to 10 carbon atoms, more preferably one having 1 to 6 carbon atoms and still more preferably one having 1 to 4 carbon atoms.

The alkyl group may be linear or branched chain.

$R^{41}$ and $R^{42}$ are identical or different, and it is preferable that $R^{41}$ and $R^{42}$ are each at least one selected from the group consisting of $-CH_3$, $-C_2H_5$, $-CHF_2$, $-CH_2F$, $-CH(CF_3)_2$, $-CHFCF_3$, $-CF_3$ and $-CH_2CF_3$.

In this case, at least one of $R^{41}$ and $R^{42}$ is at least one selected from the group consisting of $-CHF_2$, $-CH(CF_3)_2$, $-CHFCF_3$, $-CF_3$ and $-CH_2CF_3$.

$R^{41}$ and $R^{42}$ bonding with each other to form a ring means that $R^{41}$ and $R^{42}$ form a ring together with a carbon atom and an oxygen atom to which $R^{41}$ and $R^{42}$ bond, respectively, and $R^{41}$ and $R^{42}$ constitute a part of the ring as a fluorinated alkylene group. In the case where $R^{41}$ and $R^{42}$ bond with each other to form a ring, it is preferable that $R^{41}$ and $R^{42}$ are each at least one selected from the group consisting of $-CH_2CH_2CH(CH_2CF_3)-$, $-CH(CF_3)\ CH_2CH_2-$, $-CHFCH_2CH_2-$, $-CH_2CH_2CHF-$ and $-CH_2CH_2CH(CF_3)-$.

It is preferable that the fluorinated ester is at least one selected from the group consisting of the following compounds:

[Formula 11]

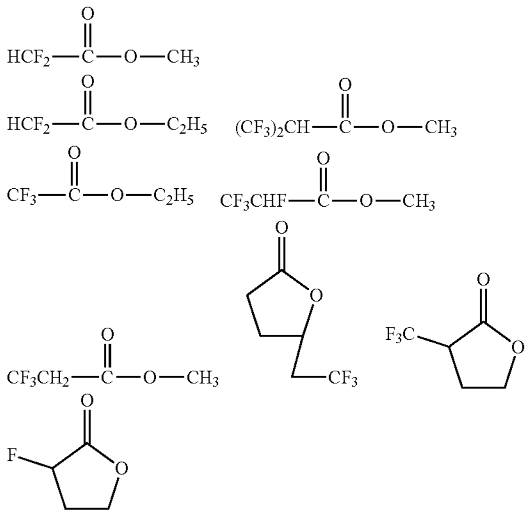

(Ether Compound)

As the ether compound, a compound represented by the following general formula (2) can suitably be used:

$$R_2-(OCHR_{3A}CH_2)_x\text{-}OR_{3b} \qquad (2)$$

wherein $R_2$ and $R_{3B}$ are each independently selected from the group consisting of an alkyl group having 1 to 9 carbon atoms and optionally substituted with fluorine, a phenyl group optionally substituted with a halogen atom and a cyclohexyl group optionally substituted with a halogen atom, and optionally together form a ring; $R_{3A}$ each independently represent H or $CH_3$; and x represents 0 to 10.

The above-mentioned compounds represented by the general formula (2) can be classified into nonfluorinated ether compounds and fluorinated ether compounds.

Hereinafter, the ether compounds will be described in detail by being divided into nonfluorinated ether compounds and fluorinated ether compounds, respectively.

(Nonfluorinated Ether Compound)

As the nonfluorinated ether compound, a compound represented by the following general formula can suitably be used:

$$R^{54}-(OCHR^{53}CH_2)_x-OR^{55}$$

wherein $R^{54}$ and $R^{55}$ are each independently selected from the group consisting of an alkyl group having 1 to 9 carbon atoms and having no fluorine, a phenyl group optionally substituted with a halogen atom and a cyclohexyl group optionally substituted with a halogen atom; provided that $R^{54}$ and $R^{55}$ optionally together form a ring; $R^{53}$ each independently represent H or $CH_3$; and x represents 0 to 10.

The alkyl group in the above formula includes a methyl group, an ethyl group, a propyl group, an isopropyl group, a butyl group, an isobutyl group, a pentyl group, an isopentyl group, a hexyl group, a heptyl group, an octyl group and a nonyl group. When the number of carbon atoms of the alkyl group exceeds 9, since the polarity of the ether compound becomes weak, the dissolvability of an alkali metal salt is likely to lower. Hence, it is preferable that the number of carbon atoms of the alkyl group is low; and preferable are a methyl group and an ethyl group, and most preferable is a methyl group.

The phenyl group optionally substituted by a halogen atom is not limited, and includes a 2-chlorophenyl group, a 3-chlorophenyl group, a 4-chlorophenyl group, a 2,4-dichlorophenyl group, a 2-bromophenyl group, a 3-bromophenyl group, a 4-bromophenyl group, a 2,4-dibromophenyl group, a 2-iodophenyl group, a 3-iodophenyl group, a 4-iodophenyl group and a 2,4-iodophenyl group.

The cyclohexyl group optionally substituted by a halogen atom is not limited, includes a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, a 4-bromocyclohexyl group, a 2,4-dibromocyclohexyl group, a 2-iodocyclohexyl group, a 3-iodocyclohexyl group, a 4-iodocyclohexyl group and a 2,4-diiodocyclohexyl group.

$R_{3A}$ represents H or $CH_3$, and in the case where x is 2 or more, are independent of each other. x represents 0 to 10, and represents the repeating number of an ethylene oxide unit. x is preferably 1 to 6, more preferably 2 to 5 and most preferably 3 or 4.

Examples of the ether compound include tetrahydrofuran (THF), 1,3-dioxolane, 1,4-dioxane, glymes, and derivatives thereof.

The ether compounds represented by the above general formula may together form a ring, and this ring compound includes, in the case where x is 0, tetrahydrofuran (THF) and a derivative thereof, 2-methyltetrahydrofuran, and in the case where x is 1, 1,3-dioxolane and 1,4-dioxane.

The glymes are represented by the above general formula (2) (provided that $R_{3A}$ represents H, x represents 1 or more, and the glymes are linear compounds), and include monoglyme (G1, x=1), diglyme (G2, x=2), triglyme (G3, x=3) and tetraglyme (G4, x=4). The monoglyme (G1) include methylmonoglyme and ethylmonoglyme; and the diglyme (G2) include ethyldiglyme and butyldiglyme.

The use of a glyme in which x is 1 to 10 as the ether compound can further improve the thermal stability, the ionic conductivity and the electrochemical stability of the electrolytic solution and can make the electrolytic solution capable of withstanding high voltages. The ether compound to be used for the electrolytic solution may be used singly in one kind, or may be used in a mixture form of two or more kinds.

(Fluorinated Ether Compound)

The above additional solvent may be, for example, a fluorinated ether compound represented by the following general formula (5):

$$Rf—(OR^{51})_{n1}—O—R^{52} \quad (5)$$

wherein Rf is an alkyl group having a fluorine atom and optionally forming a branch or a ring having 1 to 5 carbon atoms; $R^{51}$ is an alkyl group optionally having a fluorine atom; $R^{52}$ is an alkyl group having no fluorine atom and having 1 to 9 carbon atoms, and optionally forming a branch or a ring; and $n_1$ is 0, 1 or 2.

The compound represented by the above formula (5) is not limited, and examples thereof include $HCF_2CF_2OCH_2CH_2CH_3$, $HCF_2CF_2OCH_2CH_2CH_2CH_3$, $HCF_2CF_2CH_2OCH_2CH_3$, $HCF_2CF_2CH_2OCH_2CH_2CH_3$, $HCF_2CF_2CH_2OCH_2CH_2CH_2CH_3$, $CF_3CHFCF_2OCH_2CH_3$, $CF_3CHFCF_2OCH_2CH_2CH_3$ and $HCF_2CF_2OCH_2CH_3$.

Alternatively, among these compounds, two or more compounds may be mixed and used.

The fluorinated ether compound may contain a fluorinated ether represented by:

$$Rf1—(OR^{51})_{n1}—O—Rf2 \quad (5\text{-}1)$$

wherein Rf1 and Rf2 are identical or different, and are each an alkyl group having a fluorine atom; $R^{51}$ is an alkyl group optionally having a fluorine atom; $n_1$ is 0, 1 or 2; and the number of carbon atoms in one molecule is 5 or more. Examples of the fluorinated ether like (5-1) include $HCF_2CF_2CH_2OCF_2CHFCF_3$, $HCF_2CF_2CH_2OCF_2CF_2H$, $CF_3CF_2CH_2OCF_2CHFCF_3$, $CF_3CF_2CH_2OCF_2CF_2H$, $HCF_2CF_2OC_2H_5$, $HCF_2CF_2OC_2H_5OCF_2CF_2H$ and $CF_3OC_2H_5OCF_3$.

Alternatively, the above "additional solvent" may be used concurrently in two or more kinds. The content of the "additional solvent" is preferably 20 to 90% by weight with respect to the total amount of the electrolytic solution. By making the content to be in the above range, the content is preferable in the point of improved battery output.

As the "additional solvent", it is especially preferable to use fluoroethylene carbonate or the ether compound. In the case of using fluoroethylene carbonate as the additional solvent, the content of the "additional solvent" is preferably 20 to 90% by weight with respect to the total amount of the electrolytic solution. In the case of using the ether compound, the content of the "additional solvent" is preferably 30 to 70% by weight with respect to the total amount of the electrolytic solution.

(Nonaqueous Electrolyte Containing Lithium Ions)

The electrolytic solution of the present disclosure comprises a nonaqueous electrolyte containing lithium ions.

It is preferable that the nonaqueous electrolyte containing lithium ions is a lithium salt. The lithium salt is a substance that can be represented by LiX, wherein X is a counter anion. The lithium salt may be used singly or in a form of a mixture of two or more.

X is not limited, and preferable is at least one selected from the group consisting of Cl, Br, I, $BF_4$, $PF_6$, $CF_3SO_3$, $ClO_4$, $CF_3CO_2$, $AsF_6$, $SbF_6$, $AlCl_4$, bistrifluoromethanesulfonylamide (TFSA), $N(CF_3SO_2)_2$, $N(CF_3CF_2SO_2)_2$, $PF_3(C_2F_5)_3$, $N(FSO_2)_2$, $N(FSO_2)(CF_3SO_2)$, $N(CF_3CF_2SO_2)_2$, $N(C_2F_4S_2O_4)$, $N(C_3F_6S_2O_4)$, $N(CN)_2$, $N(CF_3SO_2)(CF_3CO)$, $R_4FBF_3$ (wherein $R_4F$ is $n\text{-}C_mF_{2m+1}$, where m is a natural number of 1 to 4 and n stands for normal) and $R_5BF_3$ (wherein $R_5$ is $n\text{-}C_pH_{2p+1}$, where p is a natural number of 1 to 5 and n stands for normal). In the point of the dissolvability to the ether compound and the ease of formation of a complex structure, more preferable are $N(FSO_2)_2$, $N(CF_3SO_2)_2$, $N(CF_3CF_2SO_2)_2$, $PF_6$, and $ClO_4$. Most preferable are $PF_6$ and $N(CF_3SO_2)_2$.

It is preferable that the nonaqueous electrolyte is contained in a proportion of 3.0 to 30% by weight in the electrolytic solution. With the proportion in this range, the electrolytic solution can be used as a good electrolytic solution. The lower limit thereof is more preferably 5.0% by weight and still more preferably 8.0% by weight. The upper limit thereof is more preferably 20% by weight and still more preferably 15% by weight.

In the electrolytic solution of the present disclosure, it is preferable that the lower limit of the mixing ratio (solvent/nonaqueous electrolyte) of the solvent and the nonaqueous electrolyte is 0.1 (in terms of mol) and the upper limit thereof is 5.0 (in terms of mol). The ratio in the above range is preferable because the coordination of the fluorinated ether to an alkaline metal ion is favorable. It is more preferable that the lower limit thereof is 0.5 and the upper limit thereof is 4.0.

In addition to the above-mentioned lithium salt compound, a lithium salt compound represented by the following general formula (hereinafter, referred to as "second lithium salt compound") may further be concurrently used. The second lithium salt compound is allowed to be used concurrently in two or more kinds.

[Formula 12]

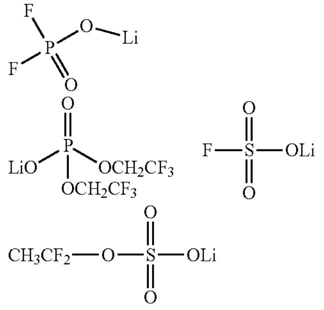

Concurrent use of these compounds is preferable because the effect of longer battery life and improved battery output can be achieved.

It is preferable that the second lithium salt compound is contained in a proportion of 0.001 to 10% by weight with respect to the total amount of the electrolytic solution.

The lower limit of the content of the second lithium salt compound is more preferably 0.01% by weight and still more preferably 0.1% by weight. The upper limit of the content of the second lithium salt compound is more preferably 5% by weight and still more preferably 3% by weight.

Alternatively, the electrolytic solution to be used in the lithium sulfur secondary battery of the present disclosure may further comprise a cyclic borate ester. With the cyclic borate ester contained, the battery can have a better capacity retention.

The cyclic borate ester is not limited, and is preferably, for example, at least one selected from the group consisting of the following compounds.

[Formula 13]

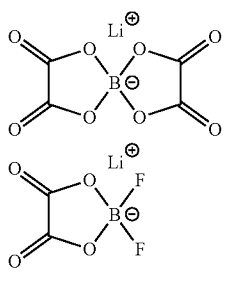

The electrolytic solution comprises preferably 0.01% by weight or higher, more preferably 1.0% by weight or higher of the above-mentioned cyclic borate ester. The upper limit is not limited, and it is preferable that the upper limit is 1.0% by weight.

Alternatively, the electrolytic solution of the present disclosure may comprise a phosphate ester. With the phosphate ester contained, the electrolytic solution is preferable in the point of longer battery life and improved battery output.

It is preferable that the content of the phosphate ester is 0.001 to 10% by weight with respect to the total amount of the electrolytic solution.

The lower limit of the content of the phosphate ester is more preferably 0.01% by weight and still more preferably 0.1% by weight. The upper limit of the content of the phosphate ester is more preferably 5% by weight and still more preferably 3% by weight.

The phosphate ester specifically includes the following compounds.

Phosphate esters such as (methyl) (2-propenyl) (2-propynyl) phosphate, (ethyl) (2-propenyl) (2-propynyl) phosphate, (2-butenyl) (methyl) (2-propynyl) phosphate, (2-butenyl) (ethyl) (2-propynyl) phosphate, (1,1-dimethyl-2-propynyl) (methyl) (2-propenyl) phosphate, (1,1-dimethyl-2-propynyl) (ethyl) (2-propenyl) phosphate, (2-butenyl) (1,1-dimethyl-2-propynyl) (methyl) phosphate and (2-butenyl) (ethyl) (1,1-dimethyl-2-propynyl) phosphate; and phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, triethylphosphine oxide, bis (2,2-difluoroethyl)2,2,2-trifluoroethyl phosphate, bis (2,2,3,3-tetrafluoropropyl)2,2,2-trifluoroethyl phosphate, bis(2,2,2-trifluoroethyl)methyl phosphate, bis(2,2,2-trifluoroethyl)ethyl phosphate, bis(2,2,2-trifluoroethyl) 2,2-difluoroethyl phosphate, bis(2,2,2-trifluoroethyl)2,2,3,3-tetrafluoropropyl phosphate, tributyl phosphate, tris(2,2,2-trifluoroethyl) phosphate, tris(1,1,1,3,3,3-hexafluoropropan-2-yl) phosphate, trioctyl phosphate, 2-phenylphenyl dimethyl phosphate, 2-phenylphenyl diethyl phosphate, (2,2,2-trifluoroethyl) (2,2,3,3-tetrafluoropropyl) methyl phosphate, methyl 2-(dimethoxyphosphoryl)acetate, methyl 2-(dimethylphosphoryl)acetate, methyl 2-(diethoxyphosphoryl)acetate, methyl 2-(diethylphosphoryl)acetate, methyl methylenebisphosphonate, ethyl methylenebisphosphonate, methyl ethylenebisphosphonate, ethyl ethylenebisphosphonate, methyl butylenebisphosphonate, ethyl butylenebisphosphonate, 2-propynyl 2-(dimethoxyphosphoryl) acetate, 2-propynyl 2-(dimethylphosphoryl)acetate, 2-propynyl 2-(diethoxyphosphoryl)acetate, 2-propynyl 2-(diethylphosphoryl)acetate, tris(trimethylsilyl) phosphate, tris(triethylsilyl) phosphate, tris(trimethoxysilyl) phosphate, tris(trimethylsilyl) phosphite, tris(triethylsilyl) phosphite, tris(trimethoxysilyl) phosphite and trimethylsilyl polyphosphate.

It is especially preferable that the above phosphate esters are specifically compounds disclosed as D-1 to D-5 in the following Examples. Use of these compounds especially suitably exhibits the above-mentioned effect.

Alternatively, the electrolytic solution to be used in the lithium sulfur secondary battery of the present disclosure may be a gel electrolytic solution which is gelatinous. The gel electrolytic solution has a constitution configured by injecting an electrolytic solution in a matrix polymer composed of an ion-conductive polymer. As this electrolytic solution, the above-mentioned electrolytic solution of the present disclosure is used. Examples of the ion-conductive polymer to be used as the matrix polymer include polyethylene oxide (PEO), polypropylene oxide (PPO), polyethylene glycol (PEG), polyacrylonitrile (PAN), copolymers of vinylidene fluoride-hexafluoropropylene (VDF-HEP), polymethyl methacrylates (PMMA), and copolymers thereof. Electrolytic solution salts such as lithium salts can well be dissolved in polyalkylene oxide-based polymers.

The electrolytic solution of the present disclosure is used for a lithium sulfur secondary battery having a positive electrode containing a sulfur-containing electrode active material containing at least one selected from the group consisting of simple sulfur, lithium polysulfides ($Li_2S_n$: 1<n<8) and organosulfur compounds, and a negative electrode containing a material that occludes and releases lithium ions. That is, use of the electrolytic solution in such a lithium sulfur secondary battery especially suitably attains the various effects as described above. The positive electrode and negative electrode will be described in detail in the below.

The present disclosure is also a lithium sulfur secondary battery having the above electrolytic solution as an essential component. Hereinafter, the lithium sulfur secondary battery will be also described in detail.

(Battery)

The alkali metal-sulfur-containing secondary battery involved in the present disclosure can be configured, for example, to have such a structure that: the above positive electrode or negative electrode and the counter electrode are disposed separately from each other through a separator; the electrolytic solution is made to be contained in the separator to constitute a cell; and a plurality of the cells are laminated or the cell is wound and housed in a case. Current collectors of the positive electrode or negative electrode and the counter electrode are led outside the case, and electrically connected to tabs (terminals), respectively. As the electrolytic solution, alternatively, the gel electrolytic solution may be used.

<Positive Electrode Containing Sulfur>

The positive electrode contains at least one sulfur-containing electrode active material selected from the group consisting of simple sulfur, lithium polysulfides ($Li_2S_n$: 1<n<8) and organosulfur compounds, and more specifically contains at least one selected from the group consisting of simple sulfur, lithium polysulfides ($Li_2S_n$: $1 \leq n \leq 8$) and organosulfur compounds. The organosulfur compounds include organic disulfide compounds and carbon sulfide compounds. Then, it is preferable to use a composite material of these sulfur-containing electrode active material and a carbon material.

Use of the above composite material results in making the above sulfur-containing electrode active material to be present in pores, and this is preferable in that the resistance can thereby be lowered.

The content of the sulfur-containing electrode active material contained in the positive electrode active material in the composite material is, from the viewpoint of making the cycle performance to become better and the overvoltage to be further lowered, with respect to the composite material, preferably 40 to 99% by mass, and more preferably 50% by mass or higher and still more preferably 60% by mass or higher, and more preferably 90% by mass or lower and still more preferably 85% by mass or lower. In the case where the positive electrode active material is the simple sulfur, the content of sulfur contained in the positive electrode active material is equal to the content of the simple sulfur.

The content of sulfur can be acquired by measuring the weight change when the positive electrode active material is heated in a helium atmosphere from room temperature to 600° C. at a temperature-increasing rate of 10° C./min.

The content of the carbon material in the composite material is, from the viewpoint of making the cycle performance to become better and the overvoltage to be further lowered, with respect to the positive electrode active material, preferably 1 to 60% by mass, and more preferably 10% by mass or higher and still more preferably 15% by mass or higher, and more preferably 45% by mass or lower and still more preferably 40% by mass or lower.

It is preferable that the carbon material to be used in the composite material of sulfur and the carbon material has pores. The "pore" includes micropore, mesopore and macropore. The micropore means a pore having a diameter of 0.1 nm or larger and smaller than 2 nm; the mesopore means a pore having a diameter of larger than 2 nm and 50 nm or smaller; and the macropore means a pore having a diameter of larger than 50 nm.

In the present invention, particularly as the composite material, there is used a carbon material in which the pore volume ratio (micropore/mesopore) of the pore volume of micropores and the pore volume of mesopores is 1.5 or higher. The pore volume ratio is more preferably 2.0 or higher. The upper limit of the pore volume ratio is not limited, and may be 3.0 or lower. When the carbon material has pores, it is presumed that dissolving-out of the positive electrode active material can considerably be suppressed. Here, the macropore volume is not added to the pore volume.

The BET specific surface area, and the average diameter and the pore volume of pores in the present invention can be determined by using a nitrogen adsorption isotherm acquired by causing nitrogen gas to be adsorbed on a sample (carbon material, composite material) at a temperature of liquid nitrogen.

Specifically, the BET specific surface area of a sample can be determined by the Brenauer-Emmet-Telle (BET) method using a nitrogen adsorption isotherm, and the average diameter and the pore volume of pores can be determined by the QSDFT method (quenched solid density functional theory) using a nitrogen adsorption isotherm.

In order to determine these, the measurement may be carried out by using, as a measuring device, for example, a specific surface area/pore size distribution analyzer (Autosorb), manufactured by Quantachrome Instruments Co., Ltd.

In the composite material, it is preferable that the positive electrode active material is contained in the pores of the carbon material, from the viewpoint of making the cycle performance to become better and the overvoltage to be further lowered. It is presumed that when the positive electrode active material is contained in the pores, dissolving-out of the positive electrode active material can considerably suppressed.

The positive electrode active material being contained in the pores can be confirmed by measurement of the BET specific surface area of the composite material. In the case where the positive electrode active material is contained in the pores, the BET specific surface area of the composite material becomes smaller than that of the carbon material alone.

It is preferable that the carbon material is a porous carbon having macropores and mesopores.

It is preferable that the carbon material has a BET specific surface area of 500 to 2,500 $m^2/g$, from the viewpoint of making the cycle performance to become better and the overvoltage to be further lowered. The BET specific surface area is more preferably 700 $m^2/g$ or larger, and more preferably 2,000 $m^2/g$ or smaller.

It is preferable that the carbon material has an average particle size of 1 to 50 nm, from the viewpoint of making the cycle performance to become better and the overvoltage to be further lowered. The average particle size is more preferably 2 nm or larger, and more preferably 30 nm or smaller.

A method for producing the carbon material is not limited, and examples thereof include a method in which a composite of an easily decomposable polymer with a hardly decomposable (thermosetting) organic component is formed and the easily decomposable polymer is removed from the composite. The carbon material can be produced, for example, by preparing a regular nanostructural polymer by utilizing the organic-organic interaction of a phenol resin and a thermally decomposable polymer, and carbonizing the resultant.

A method for producing the composite material is not limited, and includes a method of vaporizing the positive electrode active material and depositing it on the carbon material. After the deposition, the resultant may be heated at about 150° C. to remove the surplus of the positive electrode active material.

The positive electrode may comprise, in addition to the sulfur-containing electrode active material, a thickener, a binder and a conductive agent. By applying and drying a slurry (paste) of these electrode materials on a conductive carrier (current collector), the positive electrode can be produced by making the electrode materials to be carried on the carrier.

The current collector includes conductive metals, such as aluminum, nickel, copper or stainless steel, formed into a foil, a mesh, an expanded grid (expanded metal), a punched metal or the like. Alternatively, a resin having conductivity or a resin containing a conductive filler may be used as the current collector.

The thickness of the current collector is, for example, 5 to 30 μm, but is not limited in this range.

The content of the sulfur-containing electrode active material in the above electrode materials (the total amount of the sulfur-containing electrode active material and the other components, excluding the current collector) is preferably 50 to 98% by weight and more preferably 65 to 75% by weight. When the content of the active material is in the above range, since the energy density can be raised, the case is suitable.

The thickness of the electrode materials (thickness of one layer of applied layers) is preferably 10 to 500 μm, more preferably 20 to 300 μm and still more preferably 20 to 150 μm.

As the binder, there can be used polyethylene (PE), polypropylene (PP), polyethylene terephthalate (PET), polyether nitrile (PEN), polyimide (PI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), polyvinyl alcohol (PVA), polyacrylic acid (PAA), lithium polyacrylate (PAALi), polyalkylene oxide such as a ring-opened polymer of ethylene oxide or a monosubstituted epoxide, or a mixture or the like of these.

The thickener includes carboxymethylcellulose, methycellulose, hydroxymethycellulose, ethylcellulose, polyvinyl alcohol, oxidized starch, phosphorylated starch, casein, and salts thereof. These may be used singly or concurrently in two or more in any combination and any ratio.

The conductive agent is an additive that is added in order to improve the conductivity, and there can be used graphite, carbon powder such as Ketjen black, inverse opal carbon or acetylene black, carbon fibers such as vapor-grown carbon fibers (VGCF) or carbon nanotubes (CNT), or the like. Alternatively, the electrode materials may contain a supporting salt (a component contained in an electrolytic solution described below).

<Negative Electrode

The negative electrode in the lithium sulfur secondary battery of the present disclosure comprises a material that occludes and releases lithium ions. The negative electrode active material contained in the negative electrode acts so as to occlude and release alkali metal ions. The negative electrode active material is preferably at least one selected from the group consisting of lithium, sodium, carbon, silicon, aluminum, tin, antimony and magnesium. More specifically, as the negative electrode active material, there can be used conventionally well-known negative electrode materials including metal materials, such as lithium titanate, lithium metal, sodium metal, lithium aluminum alloys, sodium aluminum alloys, lithium tin alloys, sodium tin alloys, lithium silicon alloys, sodium silicon alloys, lithium antimony alloys and sodium antimony alloys, and carbon materials of crystalline carbon materials, noncrystalline carbon materials or the like, such as natural graphite, artificial graphite, carbon black, acetylene black, graphite, activated carbon, carbon fibers, coke, soft carbon and hard carbon. Among these, it is desirable to use a carbon material or lithium or a lithium transition metal composite oxide, because these can constitute a battery excellent in the input/output characteristics. As the case may be, alternatively, two or more negative electrode active materials may concurrently be used.

The negative electrode also may contain the above-mentioned active material, binder and conductive agent. Then, these electrode materials are made to be carried on a conductive carrier (current collector), whereby the negative electrode can be produced. As the current collector, a similar one as in the above can be used.

Between the positive electrode and the negative electrode, a separator is usually disposed. Examples of the separator include a glass fiber-made separator, and a porous sheet and a nonwoven fabric composed of a polymer, which absorb and hold an electrolytic solution described later. The porous sheet is constituted, for example, of a microporous polymer. Examples of the polymer constituting such a porous sheet include polyolefin such as polyethylene (PE) and polypropylene (PP), laminates having a three-layer structure of PP/PE/PP, polyimide and aramid. In particular, the polyolefin microporous separator and the glass fiber-made separator are preferable because having a property of being chemically stable to an organic solvent and being able to suppress the reactivity with the electrolytic solution low. The thickness of the separator composed of the porous sheet is not limited, and is, in applications to secondary batteries for driving vehicular motors, preferably 4 to 60 μm as the total thickness of a single layer or a multiple layer. Then, it is preferable that the diameter of micropores of the separator composed of the porous sheet is 10 μm or less at the largest (usually, about 10 to 100 nm), and the porosity is 20 to 80%.

As the nonwoven fabric, there is used, singly or as a mixture, conventionally well-known ones of cotton, rayon, acetate, nylon(R), polyester, polyolefin such as PP and PE, polyimide, aramid and the like. The porosity of the nonwoven fabric separator is preferably 50 to 90%.

Further, the thickness of the nonwoven fabric is preferably 5 to 200 m and especially preferably 10 to 100 μm. When the thickness is smaller than 5 μm, the retention of the electrolytic solution worsens; and in the case of exceeding 200 μm, the resistance increases in some cases.

A module having the above lithium sulfur secondary battery is one aspect of the present disclosure.

EXAMPLES

Hereinafter, the present disclosure will be described specifically based on Examples. In the following Examples, unless otherwise specified, “parts” and “%” represent “parts by weight” and “% by weight”, respectively.

EXAMPLES AND COMPARATIVE EXAMPLES (Preparation of Electrolytic Solutions)

Nonaqueous electrolytic solutions were obtained by mixing each component so as to make each composition described in Table 5.

(Fabrication of Coin-Type Alkaline Metal-Sulfur-Containing Secondary Batteries)

There was prepared a positive electrode mixture slurry made by mixing a composite material (the content of the sulfur was 70% by mass) containing a carbon material and a predetermined sulfur as a positive electrode active material, a carbon black as a conductive agent, a carboxymethylcellulose (CMC) dispersed with pure water, and a styrene-butadiene rubber so that the solid content ratio thereof became 92/3/2.5/2.5 (ratio in % by mass). The obtained positive electrode mixture slurry was applied uniformly on an aluminum foil current collector of 25 μm in thickness, dried thereafter compression formed by a press machine to thereby make a positive electrode. The positive electrode laminate was punched out into a size of a diameter of 1.6 cm by a punching machine to thereby fabricate a circular positive electrode.

Separately, as a negative electrode, there was used a circular lithium foil punched out into a size of a diameter of 1.6 cm.

(Production of Cells Before Tests)

The positive electrode and the negative electrode were faced to each other through a microporous polypropylene film (separator) of 25 μm in thickness; each of the nonaqueous electrolytic solutions obtained in the above was injected; after the electrolytic solution sufficiently permeated in the separator, the resultant cell was sealed, predischarged, precharged and aged to thereby fabricate coin-type alkali metal-sulfur-containing secondary batteries.

The obtained coin-type alkaline metal-sulfur-containing secondary batteries were evaluated based on the following criteria.

(Cycle Test)

The secondary batteries produced in the above were each subjected to a cycle test at 25° C. The cycle test was carried out by repeating 50 times one cycle in which constant-current charge was carried out at a current equivalent to 0.2C up to 3.0 V and then, discharge was carried out at a constant current of 0.2C down to 1.0 V. Here, 1C represents a current value at which the reference capacity of a battery is discharged in one hour; for example, 0.2C represents a current value of ⅕ thereof. In Table, discharge capacity values after 50 cycles are described.

(Discharge Capacity at a 10C Rate)

The secondary batteries produced in the above were each subjected to charge and discharge repetition at 25° C. which was carried out by repeating 3 times one cycle in which constant-current charge was carried out at a current equivalent to 0.2C up to 3.0 V and then, discharge was carried out at a constant current of 0.2C down to 1.0 V. Thereafter, constant-current charge was carried out at a current equivalent to 0.2C up to 3.0 V and then, discharge was carried out at a constant current of 10C down to 1.0 V. In Table, discharge capacity values at this time are described.

It is to be noted that symbols for additives described in Tables represent compounds indicated in Tables 1 to 4, respectively.

TABLE 1

| | | Structural Formula |
|---|---|---|
| Fluorinated ether | A-1 | $HCF_2CF_2CH_2OCF_2CF_2H$ |
| | A-2 | $HCF_2CF_2OC_3H_7$ |
| | A-3 | $HCF_2CF_2OC_4H_9$ |
| Fluorinated chain carbonate | B-1 | 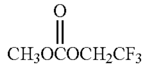 |
| | B-2 | 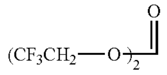 |
| Fluorinated cyclic carbonate | C-1 | 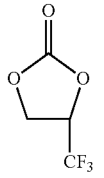 |
| | C-2 | 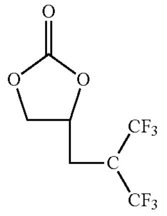 [SMILES: O=C1OCC(CC(C(F)(F)F)C(F)(F)F)O1] |
| | C-3 | 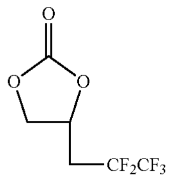 |
| | C-4 | 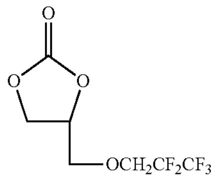 |

TABLE 2

| | | Structural Formula |
|---|---|---|
| Phosphate ester | D-1 | 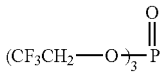 |
| | D-2 | 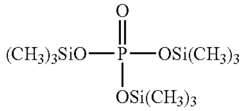 |
| | D-3 | 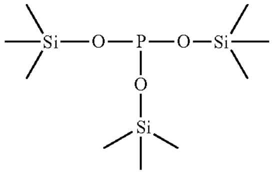 |
| | D-4 | 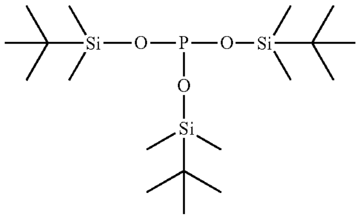 [SMILES: CC(C)(C)[Si](C)(C)OP(O[Si](C)(C)C(C)(C)C)O[Si](C)(C)C(C)(C)C] |
| | D-5 | 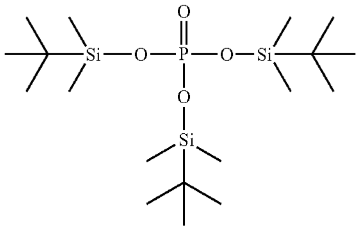 [SMILES: CC(C)(C)[Si](C)(C)OP(=O)(O[Si](C)(C)C(C)(C)C)O[Si](C)(C)C(C)(C)C] |

TABLE 3

| | | Structural Formula |
|---|---|---|
| Lithium salt | E-1 | 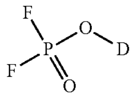 |
| | E-2 | 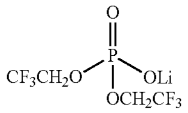 |
| | E-3 | 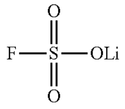 |
| | E-4 | 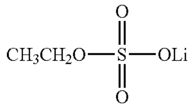 |

TABLE 4

| | |
|---|---|
| LiFSI | 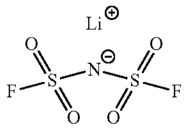 |
| LiTFSI | 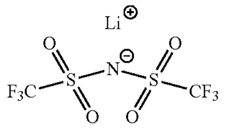 |
| LiBETI | 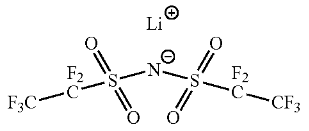 [SMILES: [Li+] ; O=S(=O)([N-]S(=O)(=O)C(F)(F)C(F)(F)F)C(F)(F)C(F)(F)F] |

TABLE 5

| | Lithium salt | Solvent 1 | Amount of Solvent 1 | Solvent 2 | Amount of Solvent 2 | Additive | Amount of Additive | Discharge Capacity after 50 Cycles (mAh/g) | Discharge Capacity at 10C Rate (mAh/g) |
|---|---|---|---|---|---|---|---|---|---|
| Example 1 | LiTFSI | VC | 100 | — | — | | | 950 | 505 |
| Example 2 | LiTFSI | VC | 75 | FEC | 25 | | | 944 | 507 |
| Example 3 | LiTFSI | VC | 50 | FEC | 50 | | | 930 | 510 |
| Example 4 | LiTFSI | VC | 25 | FEC | 75 | | | 925 | 505 |
| Example 5 | LiTFSI | VC | 10 | FEC | 90 | | | 910 | 500 |
| Example 6 | LiTFSI | VC | 50 | A-1 | 50 | | | 923 | 530 |
| Example 7 | LiTFSI | VC | 50 | A-2 | 50 | | | 925 | 532 |
| Example 8 | LiTFSI | VC | 50 | A-3 | 50 | | | 926 | 533 |
| Example 9 | LiFSI | VC | 50 | FEC | 50 | | | 929 | 510 |
| Example 10 | LIBET | VC | 50 | FEC | 50 | | | 929 | 509 |
| Example 11 | LIPF6 | VC | 50 | FEC | 50 | | | 929 | 509 |
| Example 12 | UCI04 | VC | 50 | FEC | 50 | | | 900 | 490 |
| Example 13 | LiTFSI | VC | 50 | FEC | 50 | A-1 | 1 | 932 | 520 |
| Example 14 | LiTFSI | VC | 50 | FEC | 50 | A-2 | 1 | 933 | 522 |
| Example 15 | LiTFSI | VC | 50 | FEC | 50 | A-3 | 1 | 934 | 524 |
| Example 16 | LiTFSI | VC | 50 | FEC | 50 | B-1 | 1 | 945 | 511 |
| Example 17 | LiTFSI | VC | 50 | FEC | 50 | B-2 | 1 | 943 | 510 |
| Example 18 | LiTFSI | VC | 50 | FEC | 50 | C-1 | 1 | 945 | 511 |
| Example 19 | LiTFSI | VC | 50 | FEC | 50 | C-2 | 1 | 943 | 512 |

TABLE 5-continued

| | Lithium salt | Solvent 1 | Amount of Solvent 1 | Solvent 2 | Amount of Solvent 2 | Additive | Amount of Additive | Discharge Capacity after 50 Cycles (mAh/g) | Discharge Capacity at 10C Rate (mAh/g) |
|---|---|---|---|---|---|---|---|---|---|
| Example 20 | LiTFSI | VC | 50 | FEC | 50 | C-3 | 1 | 946 | 513 |
| Example 21 | LiTFSI | VC | 50 | FEC | 50 | C-4 | 1 | 943 | 510 |
| Example 22 | LiTFSI | VC | 55 | FEC | 45 | D-1 | 1 | 937 | 518 |
| Example 23 | LiTFSI | VC | 55 | FEC | 45 | D-2 | 1 | 939 | 521 |
| Example 24 | LiTFSI | VC | 55 | FEC | 45 | D-3 | 1 | 937 | 519 |
| Example 25 | LiTFSI | VC | 55 | FEC | 45 | D-4 | 1 | 939 | 519 |
| Example 26 | LiTFSI | VC | 55 | FEC | 45 | D-5 | 1 | 938 | 520 |
| Example 27 | LiTFSI | VC | 55 | FEC | 45 | E-1 | 1 | 938 | 523 |
| Example 28 | LiTFSI | VC | 55 | FEC | 45 | E-2 | 1 | 937 | 522 |
| Example 29 | LiTFSI | VC | 55 | FEC | 45 | E-3 | 1 | 939 | 523 |
| Example 30 | LiTFSI | VC | 55 | FEC | 45 | E-4 | 1 | 937 | 522 |
| Comparative Example 1 | LiTFSI | DME | 50 | DOL | 50 | | | 702 | 334 |
| Comparative Example 2 | LiTFSI | triglyme | 98 | VC | 2 | | | 710 | 340 |
| Comparative Example 3 | LiTFSI | VC | 7 | FEC | 93 | | | 704 | 350 |

In Table 5, VC denotes vinylene carbonate.

FEC denotes fluoroethylene carbonate.

DOL denotes 1,3-dioxolane.

From the results in Table 5, it is clear that the lithium sulfur secondary batteries including the electrolytic solutions of the present disclosure were excellent particularly in durability. Further, it is clear that in the case of containing vinylene carbonate in a proportion of 10% by weight or less, as in Comparative Example 2, sufficient durability were not obtained.

INDUSTRIAL APPLICABILITY

The lithium sulfur secondary battery including the electrolytic solution of the present disclosure can be utilized as various power sources such as power sources for portable devices and power sources for vehicles.

The invention claimed is:

1. An electrolytic solution to be used for a lithium sulfur secondary battery having: a positive electrode containing a sulfur-containing electrode active material containing at least one selected from the group consisting of simple sulfur, lithium polysulfides ($Li_2S_n$: $1<n<8$) and organosulfur compounds; and a negative electrode containing a material that occludes and releases lithium ions, the electrolytic solution comprising a nonaqueous electrolyte, a solvent, and an additive, wherein the solvent comprises vinylene carbonate in a proportion of 25 to 75% by weight and further comprises fluoroethylene carbonate, and the additive contains at least one selected from the group consisting of compounds (C-1) to (C-4) and/or at least one selected from the group consisting of compounds (A-1) to (A-3):

(C-1)

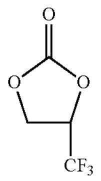

-continued (C-2)

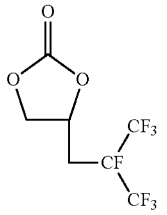

(C-3)

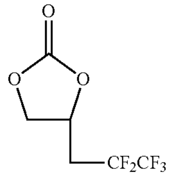

(C-4)

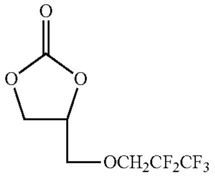

(A-1)

$HCF_2CF_2CH_2OCF_2CF_2H$ (A-2)

$HCF_2CF_2OC_3H_7$ (A-3)

$HCF_2CF_2OC_4H_9$.

2. The electrolytic solution according to claim 1, wherein the nonaqueous electrolyte comprises at least one compound selected from the group consisting of $LiPF_6$, lithium bis(trifluoromethanesulfonyl)imide (LiTFSI) and lithium bis(fluorosulfonyl)imide (LiFSI).

3. A lithium sulfur secondary battery, comprising: a positive electrode containing a sulfur-containing electrode active material containing at least one selected from the group consisting of simple sulfur, lithium polysulfides ($Li_2S_n$: $1<n<8$) and organosulfur compounds; and a negative electrode containing a material that occludes and releases lithium ions, wherein the lithium sulfur secondary battery comprises the electrolytic solution according to claim 1.

4. A module, comprising the lithium sulfur secondary battery according to claim 3.

5. The electrolytic solution according to claim 1, wherein the nonaqueous electrolyte is a lithium salt.

6. The electrolytic solution according to claim 1 wherein the solvent comprises fluoroethylene carbonate in a proportion of 25 to 75% by weight.

7. The lithium sulfur secondary battery according to claim 3, wherein the solvent comprises fluoroethylene carbonate in a proportion of 25 to 75% by weight.

* * * * *